United States Patent [19]
Bauer et al.

[11] Patent Number: 5,648,998
[45] Date of Patent: Jul. 15, 1997

[54] CAMERA THAT PROJECTS DATA

[75] Inventors: Walter Bauer, Munich; Eberhard Werner, Peiting, both of Germany

[73] Assignee: Agfa-Gevaert Aktiengesellschaft, Leverkusen, Germany

[21] Appl. No.: 420,225

[22] Filed: Apr. 11, 1995

[30] Foreign Application Priority Data

May 11, 1994 [DE] Germany ............ 44 16 736.9

[51] Int. Cl.[6] ............................................ G03B 42/04
[52] U.S. Cl. ............................................ 378/166; 378/165
[58] Field of Search ................................ 378/166, 162, 378/165, 204

[56] References Cited

U.S. PATENT DOCUMENTS

| | | | |
|---|---|---|---|
| 3,628,864 | 12/1971 | Fessenden et al. | 355/18 |
| 4,281,915 | 8/1981 | Krobel | 354/275 |
| 4,383,329 | 5/1983 | Kroebel et al. | |
| 5,311,567 | 5/1994 | Pellegrino et al. | 378/166 |
| 5,416,823 | 5/1995 | Livingston | 378/166 |

FOREIGN PATENT DOCUMENTS

| | | |
|---|---|---|
| 2464503 | 6/1981 | France. |
| 8801205 | 7/1989 | WIPO. |

*Primary Examiner*—David P. Porta
*Attorney, Agent, or Firm*—Furgang & Milde, LLP

[57] ABSTRACT

A camera that projects data onto an X-ray film (2). The film is accommodated in a light-tight cassette (3). The data is imaged onto the film with light projected along a row (A) through an open window (4) in the cassette. The camera is characterized by means (24a, 24b, 25a, 25b, & 29) of releasably securing the cassette relative to the top (1a) of the camera along and/or across the row and by a control unit (27) that actuates the securing means during exposure and acts in conjunction with sensors (15a, 15b, & 15c) which emit signals in accordance with the orientation of the cassette.

11 Claims, 4 Drawing Sheets

CAMERA THAT PROJECTS DATA

BACKGROUND OF THE INVENTION

The present invention concerns a camera that projects data on X-ray film. More particularly, the present invention concerns a camera which images data onto x-ray film along a row through an open window in the cassette.

X-ray films are employed in industry to detect defects in materials and in the field of medicine for diagnosis. It is often necessary to record along with the image such associated data as date of exposure, operator's name, type of film, tube voltage, description of subject, etc. Medical applications also require such patient-specific data as name, date of birth, insurance provider, etc. on the film. Patient-specific data can be previously printed or typed on cards as described in the U.S. Pat. No. 4,383,329, with one card for each patient, and thereby projected onto the film. Since, on the other hand, such data are often stored digitally in a central computer, some way of recording them directly on the film is also desirable. The liquid-crystal display described in the U.S. Pat. No. 4,383,329 is not particularly effective for the purpose because such displays still do not provide adequate contrast to ensure satisfactory legibility on film.

Patient-specific data are currently entered in batches into a central computer, either manually through terminals comprising a monitor and keyboard or from patient identification cards, such as those called C2 cards, by magnetic strip or bar code readers. The digitized data can then be processed in accordance with a specific program in the central computer and forwarded to other equipment as desired.

A system for projecting data on X-ray film is also known from the published International Application No. WIPO 89/06377. In this system the data is projected onto the film from light-emitting diodes. The film is accommodated, as is conventional in the medical field, in a cassette. The cassette has a window through which the data can be projected onto the film. The diodes are distributed in a row that moves perpendicularly over the exposure window, and flash sequentially or simultaneously, constructing characters on the film point by point.

The resolution obtainable at a comparable range of contrast with a system like that described in the WIPO document, however, is not as satisfactory as that obtained with the recording apparatus described in the aforesaid U.S. patent.

SUMMARY OF THE INVENTION

The object of the present invention is accordingly to improve the quality of the data projected onto X-ray film with a camera of the type disclosed in the aforesaid WIPO document, wherein the data is projected along a row through an open window in the cassette.

This object, as well as other objects which will become apparent from the discussion that follows, are achieved, in accordance with the present invention, by providing (a) means for securing and releasing the X-ray cassette relative to the camera in a direction parallel or perpendicular to the row, (b) a plurality of sensors for sensing when the cassette is in the proper position for data projection, and (c) a control unit for actuating the securing means during exposure in response to signals received from the sensors.

The point of departure for the present invention was the awareness that an X-ray cassette can easily be jolted while the film it accommodates is being exposed, causing the data to be blurred. Several reasons for this have been discovered.

First, the cassettes are inserted manually into the camera, which causes vibration. Second, the data projection and exposure process described above takes a relatively long time, which provides more opportunity for vibration. Finally, although X-ray cassettes are relatively large objects, 40 by 40 cm or 30×95 cm for example, they are secured inside the camera with relatively short guide surfaces. Consequently, even limited motions at one end of the cassette can lead to vibration of the film during exposure.

With the method in accordance with the present invention, data can be reproduced in even large cassettes without blurring.

For a full understanding of the present invention, reference should now be made to the following detailed description of the preferred embodiment of the invention as illustrated in the accompanying drawings.

DESCRIPTION OF THE PREFERRED EMBODIMENT

Figure 1:
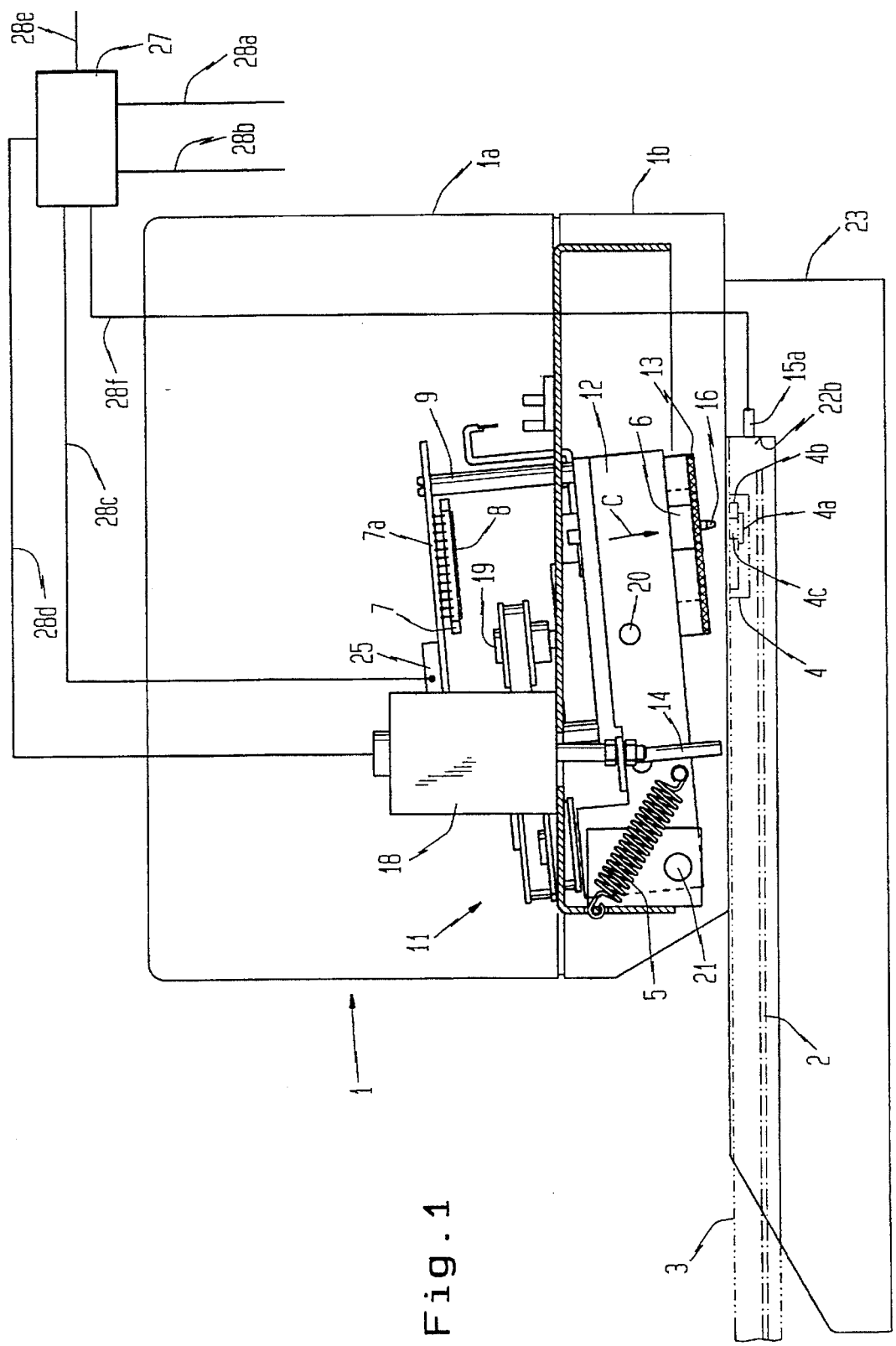
FIG. 1 is a side elevational view of a data projection camera in accordance with one preferred embodiment of the present invention.

The preferred embodiments of the present invention will now be described with reference to FIGS. 1–5 of the drawings. Identical elements in the various figures are designated with the same reference numerals.

FIG. 1 illustrates a data projection camera 1 with a top 1a and a bottom 1b. An X-ray film 2 is accommodated in a cassette 3 that rests against a support 23 inside the camera. Data can be projected onto the film 2 through a film-exposure window 4 in the cassette. Window 4 can be opened and closed by a light-tight slide 4b. Sensors 15a, 15b and 15c in the form of microswitches are mounted on camera 1 and engage grooves in the front of the cassette 3 when the cassette is correctly oriented. In that event film-exposure window 4 will be in the vicinity of the sensors 15a, 15b, and 15c. When the cassette 3 is incorrectly oriented, sensors 15a, 15b, and 15c emit an error signal over a line 28f to a control unit 27.

Photoelectric devices which sense reflected light can be employed instead of microswitches.

The data camera 1 also accommodates a microchip 7 with light emitting diodes 8 disposed in rows on the bottom. A lens 6 focuses an image of the diodes precisely on the film 2 through the film exposure window 4. A camera-side window opening mechanism 11 includes a release pin 16, a belt drive 19, a guide rod 20, and a lifting electromagnet 18. Chip 7 is mounted on a printed circuit board 7a that also includes other electronic components 25 and a microprocessor. All the electronic and electric subassemblies are connected to the control unit 27 by lines 28a, 28b, 28c, and 28d. Control unit 27 can be connected, in turn, to a computer by a line 28e which supplies the data. Printed circuit board 7a is mechanically fastened to window opening mechanism 11 by stud bolts 9. The mechanism 11 is driven by means of the belt drive 19 by an unillustrated motor. The base 12 of the window opening mechanism 11 pivots along with a spring 5 on a shaft 21 that is held stationary with respect to the camera. The base can be lowered against the force of the spring 5 in the direction indicated by arrow C by the magnet 18. The base 12 remains in the upper position illustrated in FIG. 1 as long as there is no cassette 3 in camera 1. When a cassette is properly inserted, the electromagnet 18, responding to a signal from the control unit 27, draws the base 12 down into the position wherein all of film exposure window 4 is sealed light tight by a seal 13.

A stop 14 limits the downward travel of the base 12 over the top of the film cassette 3, ensuring a definite association between the focal plane of lens 6 and the surface of the film 2. The level of the stop 14 is adjustable to various cassette widths.

With the base 12 in the lower position, the release pin 16 extends into an unlocking opening 4c in the slide 4b and engages a rocker element 4a, forcing the slide perpendicular to the plane of projection and opening film exposure window 4.

Figure 2:
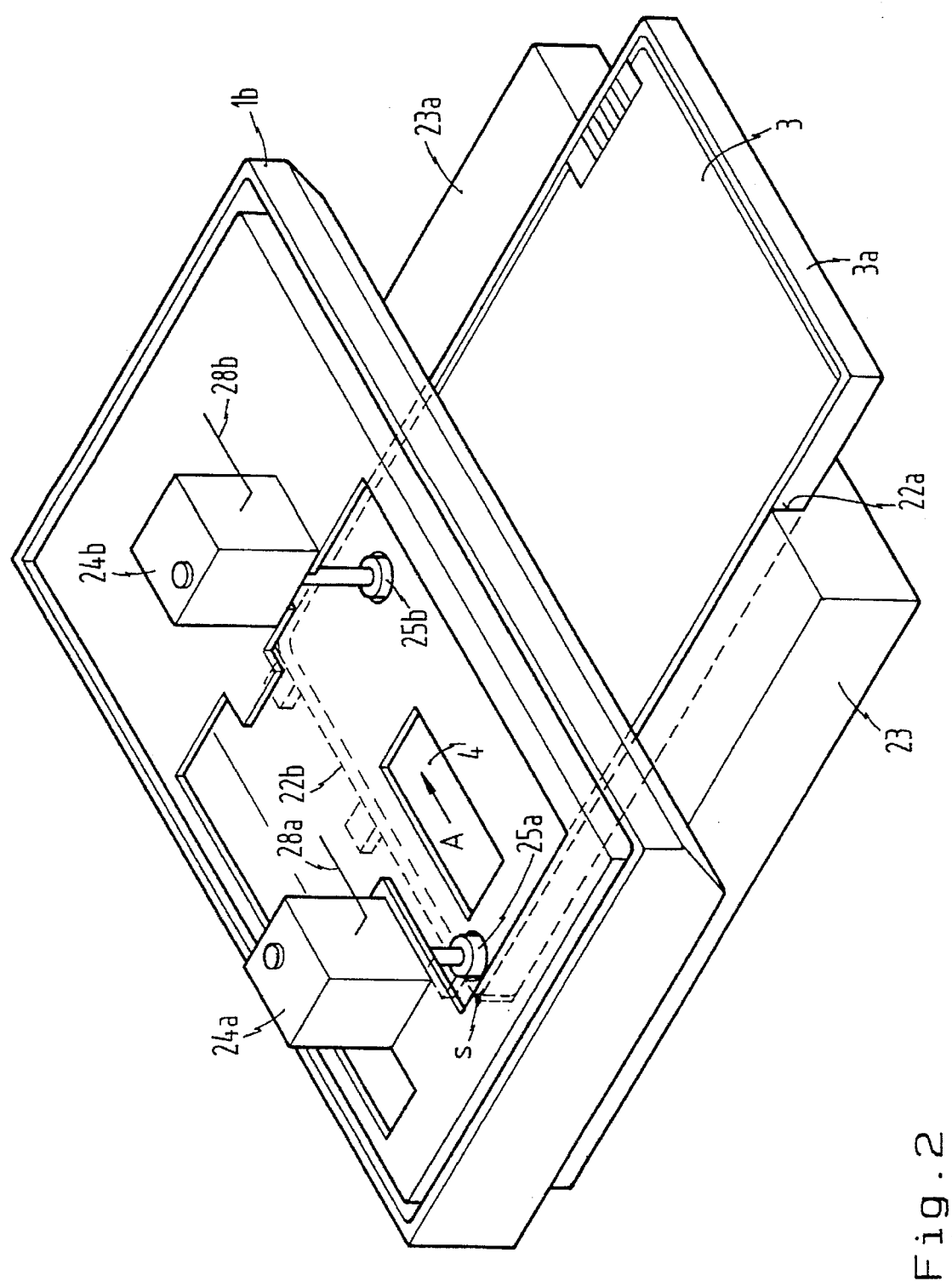
FIG. 2 is a perspective view of the camera illustrated in FIG. 1 with its top removed.
Figure 3:
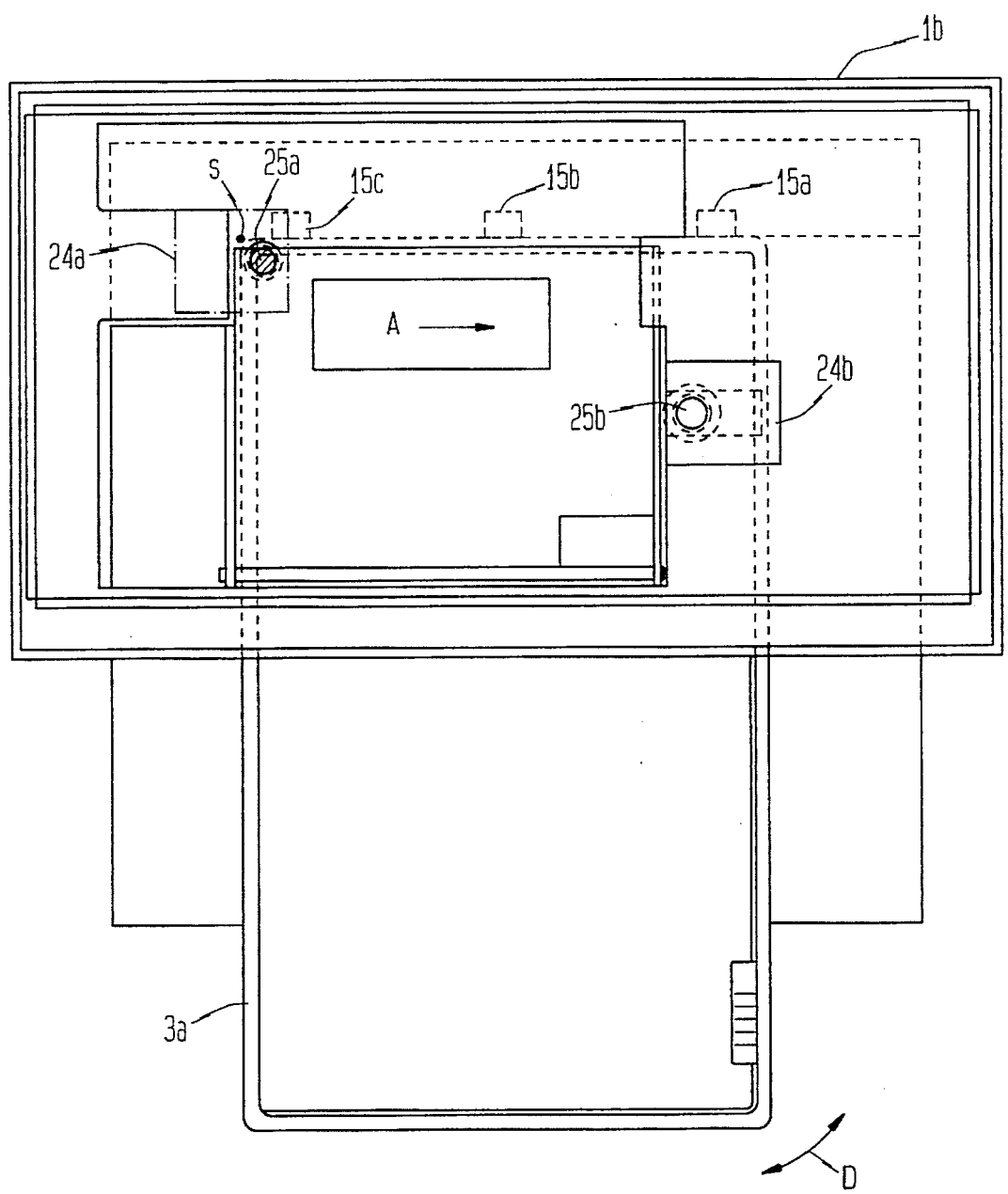
FIG. 3 is a top view of the camera illustrated in FIGS. 1 and 2.

Exposure commences as soon as the window 4 opens. The LED chip 7 advances along with the window opening mechanism 11 perpendicular to the plane of projection of FIG. 1, over the film exposure window 4, in the direction of arrow A, as represented in FIGS. 2 and 3. The characters are projected point by point onto the film 2 whereby each data character is formed of many points. Light emitting diodes 8 are actuated pulse by pulse, controlled by a multiplexing process. Each point imaged on the film 2 will accordingly consist of several individual overlapping exposures. The total exposure lasts approximately one second.

FIG. 2 illustrates the data camera 1 with top 1a open and the window opening mechanism 11 removed. The bottom of the camera comprises a support 23 for the cassette 3.

The cassette support 23 has two mutually perpendicular stop surfaces 22a and 22b that cassette 3 can rest against. In the vicinity of the point s of intersection of stops 22a and 22b is an electromagnet 24a that raises and lowers a cassette fastener 25a. The cassette fastener 25a comprises a hard metal sleeve with a rubber dowel vulcanized into it and extending downwardly beyond the bottom of the sleeve. The rubber has a high coefficient of friction and, when lowered, tightly secures an inserted cassette 3. Since the rubber is accommodated very securely in the cassette fastener 25a, the fastener is highly resistant to shearing forces, ensuring that the cassette will be tightly and reliably secured.

FIG. 3 illustrates even more explicitly how the cassette fastener 25a operates. The fastener is secured in the vicinity of the point s of intersection of stops 22a and 22b and fastens cassette 3 firmly along its edge 3a. This is of particular advantage because the edges of X-ray cassettes have a standard height. The cassette 3 is prevented from rotating about an arc D, around the point where it is being held by the fastener 25a, by another electromagnet 24b and associated fastener 25b, which are as remote as possible from the magnet 24a and fastener 25a. The distance is approximately 15 cm, ensuring a satisfactory grip at both points on even the smallest cassettes (13×18 cm) currently employed in practice. If an even smaller cassette is to be employed, only one electromagnet 24a or 24b is engaged.

Figure 4:
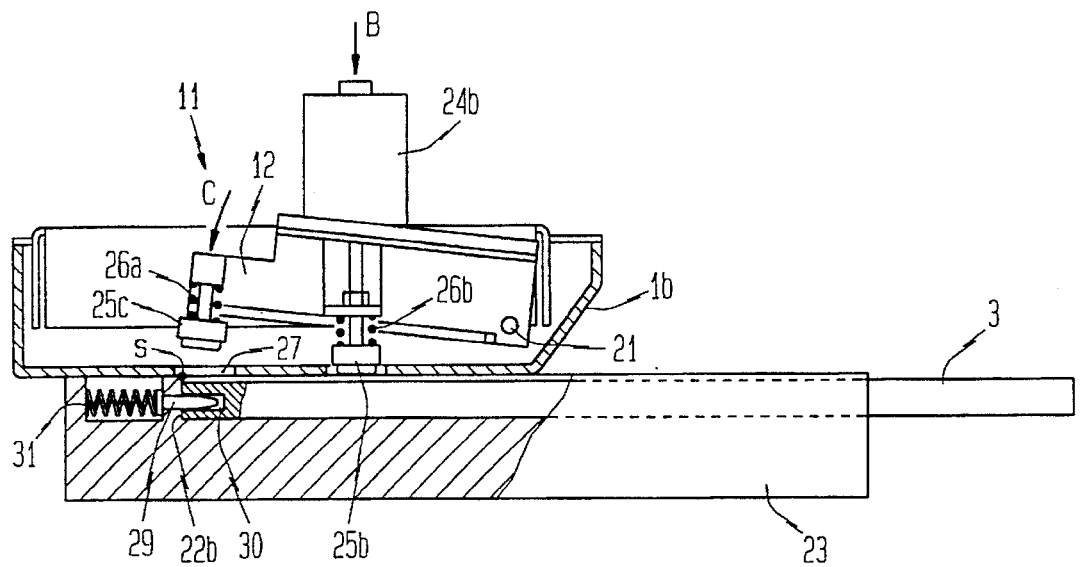
FIG. 4 is a section through a data projection camera according to another preferred embodiment of the present invention.

FIG. 4 illustrates a slightly different embodiment of a data projection camera. It lacks the electromagnet 24a; rather the cassette 3 is held fast in the vicinity of the point s of intersection of the two stops 22a and 22b by a cassette fastener 25c that is forced directly against the base 12 of the window opening mechanism 11 by a pressure spring 26a. The pressure at point s is produced in this event by the electromagnet 18 in conjunction with the spring 26a and the cassette fastener 25c. Differences in the thickness of the cassettes are compensated for in this embodiment by a compression spring 26b between cassette fastener 25b and an electromagnet 24b.

Accommodated in lower housing 1b is a guide opening 27 that guides the first cassette holder 25c in the direction indicated by arrow C as the window opening mechanism 11 travels downwardly. Second cassette holder 25b is drawn downward in the direction indicated by arrow B by the electromagnet 24b.

The data projection camera 1 in this embodiment also incorporates a projection 29 that fits into a recess 30 in the leading edge 3a of cassette 3 as the cassette is inserted. Projection 29 is conical to facilitate the engagement. The projection prevents displacement of the cassette along or across the direction A (FIG. 3) of exposure while the film is being exposed. To prevent the projection 29 from damaging the cassette 3 in the event of misalignment, the projection is biased outwardly by the force of a spring 31. It can be retracted into camera 1 until it becomes coplanar with the rear stop surface 22b. The operator can easily tell whether the cassette 3 is correctly positioned in this embodiment of the camera 1 simply by attempting to rotate the cassette in the same plane as the cassette support 23 or film 2. If it is impossible to rotate the cassette, it and the film exposure window 4 are correctly positioned in the camera 1.

Figure 5:
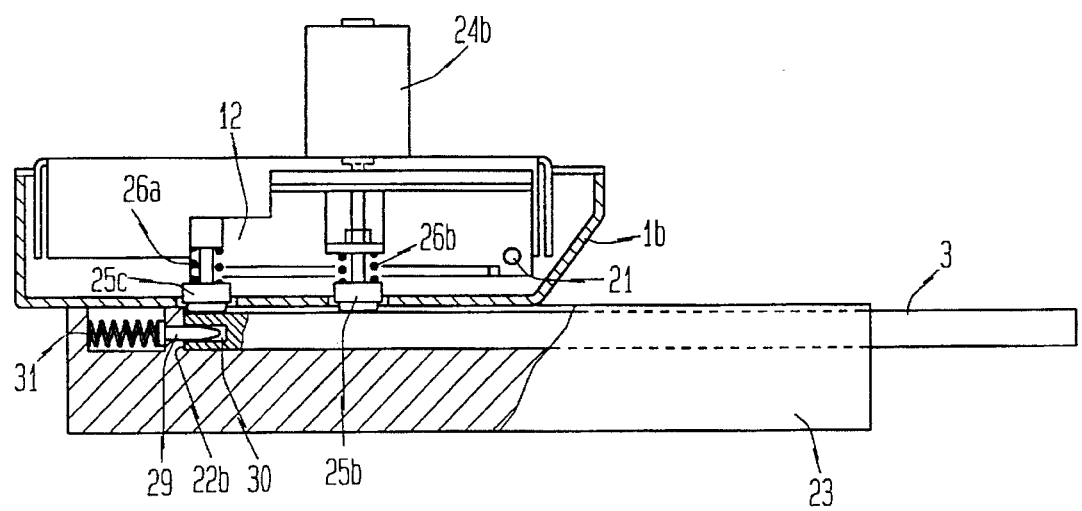
FIG. 5 is a section through the camera illustrated in FIG. 4 at another stage of operation.

FIG. 5 illustrates the data projection camera during exposure. The base 12 is down and the cassette fasteners 25b and 25c secure the cassette 3. After exposure the base 12 is raised and the cassette fastener 25b is lifted off by the electromagnet 24b. The cassette 3 is thereby released and can be extracted from the camera 1 again.

The present invention is not restricted to the aforesaid embodiments. A number of similar embodiments of the invention are also possible. The film can also be exposed by a laser diode instead of light-emitting diodes for example, with their light directed over the window by a pivoting or polygonal mirror. It is also conceivable to secure the cassette with means other than the clamping fasteners and the projection that fits into it. To improve the clamping effect, the support 23 may be provided with a rubber-like anti-slip surface where the cassette rests against it.

There has thus been shown and described a novel data projection camera which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a camera that projects data onto an X-ray film that is accommodated in a light tight cassette, wherein the data is imaged onto the film by means of light projected along a row and through an open window in the cassette, the improvement comprising (a) means for releasably securing the X-ray cassette relative to the camera in at least one of the directions that are parallel and perpendicular to the row, (b)

light sealing means for covering the cassette surface surrounding the window to prevent entry of ambient light upon receipt of a control signal, said light sealing means being operative independently from said securing means, (c) window opening means for opening the window upon receipt of a control signal, said window opening means being operative independently of said securing means, (d) a plurality of sensors for sensing when the cassette is in the proper position for data projection, and (e) control means, responsive to said sensors, for actuating said securing means, for actuating said light sealing means and said window opening means and for initiating the data projection when the cassette is in the proper position and said window is open.

2. The data projection camera defined in claim 1, wherein the sensors include microswitches electrically connected to the control means.

3. The data projection camera defined in claim 1, wherein the cassette securing means include a fastener which releasably clamps the cassette in position at a point.

4. The data projection camera defined in claim 1, wherein the cassette securing means include a projection that fits into a recess in the cassette.

5. The data projection camera in claim 1, further comprising two mutually perpendicular stop surfaces arranged to abut the cassette when the cassette is placed in the camera, whereby a corner of the cassette can be positioned at the point of intersection of the stop surfaces.

6. The data projection camera defined in claim 3, wherein the cassette fasteners have a coefficient of friction approximating that of rubber.

7. The data projection camera defined in claim 1, wherein the cassette securing means include a spring that subjects the cassette to a resilient biasing force when secured in position.

8. The data projection camera defined in claim 3, wherein the cassette securing means comprises a plurality of fasteners which clamp the cassette in position at various points.

9. The data projection camera defined in claim 8, wherein the cassette securing means include a base and an electromagnet responsive to the control means for raising and lowering the base about a pivot axis, and wherein means fastened to the base apply pressure to a cassette inserted in the camera when the base is in the lower position.

10. The data projection camera defined in claim 8, wherein the camera has a plurality of stop surfaces which abut the cassette and wherein the securing means is disposed in the vicinity of one of the stop surfaces and accordingly secures the cassette at a face side thereof adjacent the stop surface.

11. The data projection camera defined in claim 1, wherein the data is imaged onto the film by means of temporally and spacially modulated light.

\* \* \* \* \*